(No Model.) 2 Sheets—Sheet 2.
B. F. KELLEY.
FEED WATER HEATER.
No. 600,480. Patented Mar. 8, 1898.
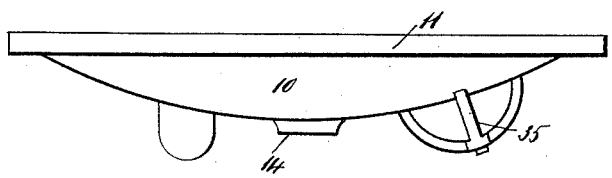
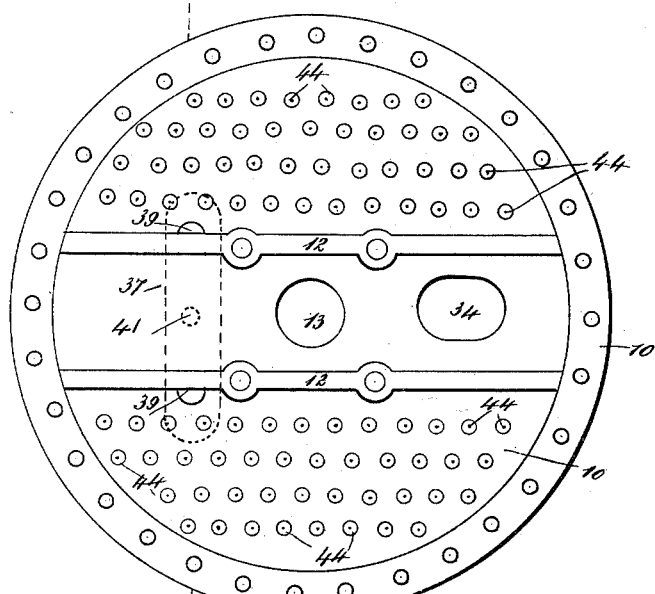
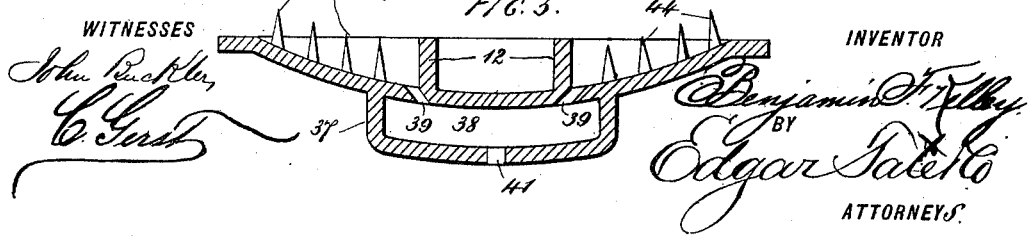
WITNESSES
INVENTOR
Benjamin F. Kelley
BY Edgar Tate & Co
ATTORNEYS

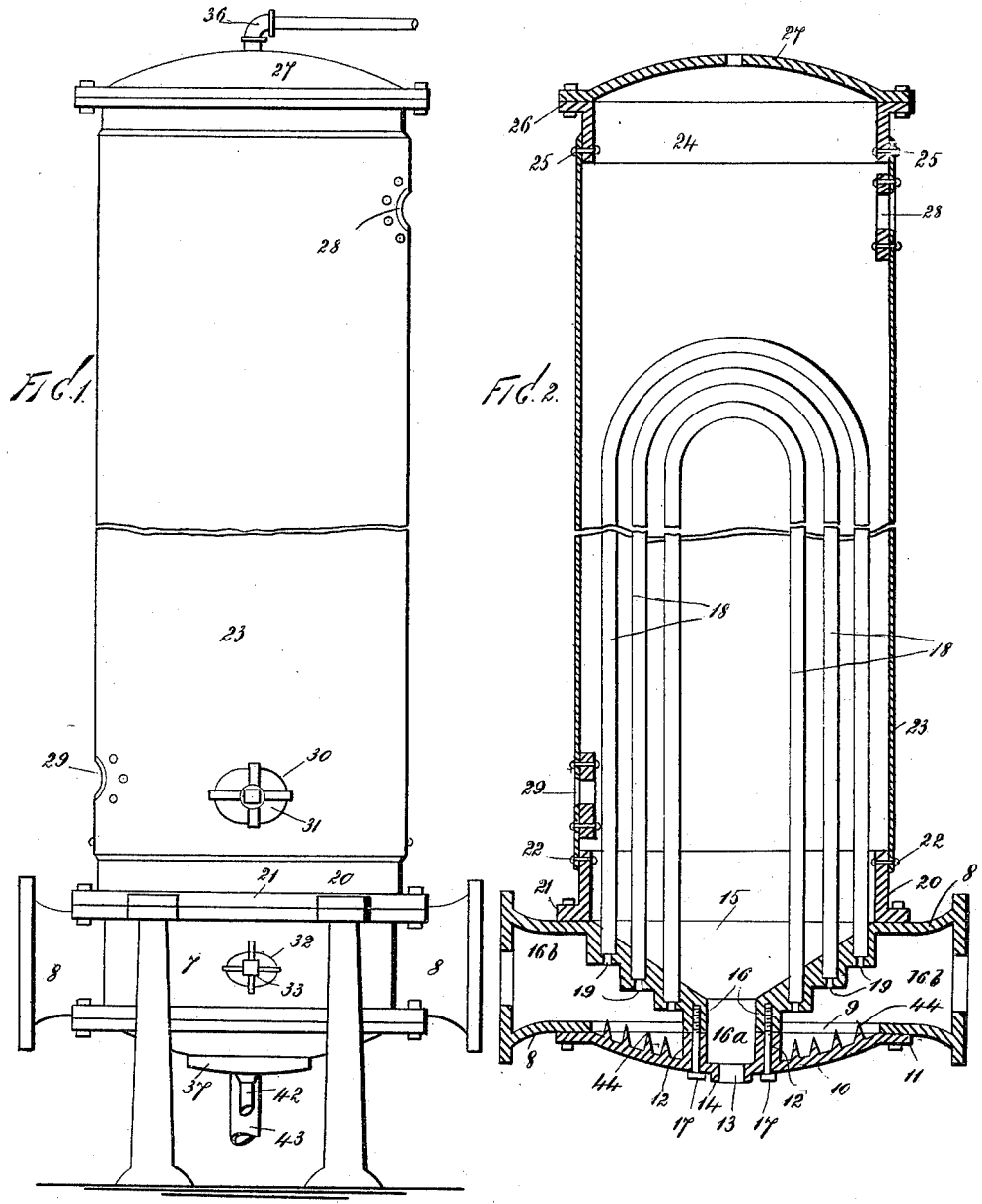

UNITED STATES PATENT OFFICE.

BENJAMIN FRANKLIN KELLEY, OF BROOKLYN, NEW YORK.

FEED-WATER HEATER.

SPECIFICATION forming part of Letters Patent No. 600,480, dated March 8, 1898.

Application filed February 12, 1897. Serial No. 623,102. (No model.)

*To all whom it may concern:*

Be it known that I, BENJAMIN FRANKLIN KELLEY, a citizen of the United States, residing at Brooklyn, in the county of Kings and State of New York, have invented certain new and useful Improvements in Feed-Water Heaters for Steam-Boilers, of which the following is a full and complete specification, such as will enable those skilled in the art to which it appertains to make and use the same.

This invention relates to feed-water heaters for steam-boilers; and the object thereof is to provide an improved feed-water heater of the class known as the "Berryman" type and by means of which I provide improved facilities for internal inspection and cleaning without removing or raising the shell of the heater, a further object being to provide a deep settling-chamber below the tubes of the heater where sediment may be collected and blown off without interfering with or scaling the shell or tubes, a further object being to provide improved means for separating the oil from the exhaust-steam, so that after leaving the heater it may be used for heating purposes and returned to the boiler.

My improvement also involves a single connection for the drip-pipe, which will drain the oil and water of condensation from the separators on both sides of the heater at once, and two additional hand-holes in the tube-sheet and bottom plate, in addition to one in the shell, whereby the tube-sheet and settling-chamber can be quickly examined and cleaned when it is not desired to remove the bottom plate.

The invention is fully disclosed in the following specification, of which the accompanying drawings form a part, in which the separate parts of my improvement are designated by the same numerals of reference in each of the views, and in which—

Figure 1 is a side view of my improved feed-water heater; Fig. 2, a central vertical section thereof; Fig. 3, a side view of the bottom plate detached and on an enlarged scale; Fig. 4, a plan view thereof, and Fig. 5 a transverse section on the line 5 5 of Fig. 4.

In the practice of my invention I provide a feed-water heater of the class herein specified, which comprises a cylindrical hollow base 7, which is provided at its opposite sides with tubular extensions 8, with which in practice the steam-pipes are connected, and one of said extensions is adapted to serve as a steam-ingress and the other as a steam-egress, and the base 7 is provided at the bottom thereof with a circular opening 9, which is adapted to be closed by a bottom plate 10.

The bottom plate 10 is concavo-convex in form and provided with an annular flange or rim 11, by which it is bolted to the base 7, and said bottom plate is provided with two transverse upwardly-directed flanges or walls 12 and centrally thereof between said flanges or walls with a circular opening 13, which is formed in a depending tubular projection 14, and the top of the tube-sheet or base 7 is provided with a central conical cavity or depression 15, at the bottom of which are two transverse walls or flanges 16, which correspond with the walls or flanges of the bottom plate 10, and which are bolted thereto by means of bolts or screws 17, and between the walls or flanges 16 is an opening large enough to permit a workman to pass through the tube-sheet or base-plate 7.

The connection of the circular base 7 and the bottom plate 10 by means of the transverse walls or flanges 12 on said bottom plate and the transverse walls or flanges 16 divide said base 7 into a setting-chamber $16^a$ and two equal steam-chambers $16^b$, as will be readily understood, and secured in the opposite side walls of the cavity or depression 15 are the heating-tubes 18, which are U-shaped in form, as clearly shown in Fig. 2, and the lower ends thereof are secured in the opposite side walls of the conical cavity or depression 15 in any desired manner, and formed in said side walls are openings 19, with which the opposite ends of said tube communicate. I also provide a ring or band 20, which is provided with an outwardly-directed annular flange or rim 21, by which it is bolted to the top of the cylindrical base 7, so as to inclose the cavity or depression 15, and bolted to the ring or band 20, as shown at 22, is the main cylindrical casing or drum 23 of the heater, which is provided at its upper end or top with a ring or band 24, which is bolted thereto, as shown at 25, and which is provided at its upper end or side with an annular outwardly-directed flange or rim 26, to which is bolted a convexo-concave cap 27.

The drum or casing 23 is provided near its upper end with a feed-water outlet 28 and near its lower end and preferably on the opposite side with a corresponding feed-water inlet 29, and formed in the side at said drum or casing near the lower end thereof is a hand-hole 30, which is closed by a cap 31 in the usual manner.

The cylindrical base or casing 7 is also provided with a hand-hole 32, which is also closed by a cap or cover 33, and formed in the bottom plate 10 is another hand-hole 34, which is closed in the same manner as shown at 35, these parts of the construction being best shown in Figs. 3 and 4.

The cap or cover 27 is provided with a steam-blow-off pipe 36, and formed on the bottom plate 10 is a transverse oblong depression 37, in which is formed a drip-chamber 38, and this drip-chamber 38 communicates with the opposite sides of the base or cylindrical bottom 7 by passages 39, and formed in the bottom wall of the chamber 38 is an opening 41, with which a drip-pipe 42 is connected, and communicating with the opening 13, formed in the tubular downwardly-directed extension 14 of the bottom plate, is a pipe 43, which constitutes a blow-off for mud and other impurities of the feed-water.

The bottom plate 10 is provided on its upper surface and at each side of the transverse vertical flanges or walls 12 with a number of upwardly-directed points or projections 44, and these points or projections materially aid the tubes 18 in extracting the oil from the exhaust.

The operation will be readily understood from the foregoing description when taken in connection with the accompanying drawings and the following statement thereof.

The exhaust-steam for heating the feed-water enters through one of the tubular extensions 8, and after passing through the tubes 18 passes out through the opposite tubular extension 8. The drum or casing 23 is filled with water, which passes in through a tube which communicates with an opening 29 at or near the bottom thereof, and which is not shown, and said feed-water leaves said drum or casing 23 at or near the top thereof by means of a pipe, which is also not shown, and it will be understood that the top plate 27 may be removed whenever desired, as may also the bottom plate 10. The removal of both of these plates, and particularly the bottom plate, renders the cleaning of my improved feed-water heater a matter of very slight difficulty, as will be understood, and the hand-hole 34 at or near the bottom of the drum or casing 23 also facilitates this operation. The chamber 37, which communicates with the bottom plate 10, and the pipe 42, which communicates therewith, serve as a drain, and the opening 13 and the pipe 43, which communicates therewith, serve as a blow-off, as will be readily understood.

By detaching the ring or band 15 from the circular base or bottom 7 the tubes 18 may be removed or repaired whenever desired and new tubes placed in position when necessary, and it will thus be seen that I accomplish the object of my invention by means of a device which is simple in construction and operation and which is well adapted to produce the result for which it is intended.

Having fully described my invention, I claim as new and desire to secure by Letters Patent—

1. The herein-described feed-water heater, said heater comprising a circular hollow base at the opposite sides of which are formed tubular extensions, said casing being also provided with a circular opening in the bottom thereof, a detachable plate for closing said opening, said detachable plate being provided with transverse vertical walls or flanges, and said base being also provided at its upper side with a conical cavity or depression at the bottom of which are depending transverse walls or flanges between which is an opening or manhole which corresponds with those formed on the upper side of the detachable bottom plate, and which are connected therewith by bolts which are passed through said bottom plate, said circular base being also provided with an upright cylindrical drum or casing in which are placed a plurality of pipes, the ends of which are connected with passages or openings formed in the opposite sides of said conical cavities or depressions, and said drum or casing being provided with a feed-water inlet or outlet, and said bottom plate being also provided centrally thereof with a blow-off which communicates with the space between said walls or flanges, and with a transverse drip-chamber which communicates with the space within the bottom or base at each side of said walls or flanges, and between said walls or flanges, substantially as shown and described.

2. The herein-described feed-water heater, said heater comprising a circular hollow base at the opposite sides of which are formed tubular extensions, said casing being also provided with a circular opening in the bottom thereof, a detachable plate for closing said opening, said detachable plate being provided with transverse vertical walls or flanges, and said base being also provided at its upper side with a conical cavity or depression at the bottom of which are depending transverse walls or flanges between which is an opening or manhole which corresponds with those formed on the upper side of the detachable bottom plate, and which are connected therewith by bolts which are passed through said bottom plate, said circular base being also provided with an upright cylindrical drum or casing in which are placed a plurality of pipes, the ends of which are connected with passages or openings formed in the opposite sides of said conical cavities or depressions, and said drum or casing being provided with a feed-water inlet or outlet, and said bottom plate being also provided centrally thereof with a blow-off which communicates with the space between said walls or flanges, and with a transverse drip-chamber which communicates with the space within the bottom or base at each side of said walls or flanges, and between said walls or flanges, and said bottom plate being also provided with upwardly-directed points or projections which correspond with the openings or passages in the side of the conical cavity or depression with which said pipes are connected, substantially as shown and described.

In testimony that I claim the foregoing as my invention I have signed my name, in presence of the subscribing witnesses, this 5th day of February, 1897.

BENJAMIN FRANKLIN KELLEY.

Witnesses:
    CHARLES A. MERRYWEATHER,
    GEORGE M. REEVES.